United States Patent [19]

Berti

[11] Patent Number: 4,479,177

[45] Date of Patent: Oct. 23, 1984

[54] SERVOMECHANISMS

[75] Inventor: Eugenio Berti, Falkland, Scotland

[73] Assignee: Burroughs Corporation, Detroit, Mich.

[21] Appl. No.: 322,119

[22] Filed: Nov. 17, 1981

Related U.S. Application Data

[63] Continuation-in-part of Ser. No. 324,351, filed as PCT GB81/00202, Sept. 24, 1981, published as WO82/01264, Apr. 15, 1982, §102(e) date Nov. 17, 1981, abandoned.

[30] Foreign Application Priority Data

Sep. 24, 1981 [PC] GB81/00202 .... PCT/GB/81/00203
Sep. 30, 1980 [GB] United Kingdom ................. 8031489

[51] Int. Cl.$^3$ ........................................... G05B 23/00
[52] U.S. Cl. .................................. 364/159; 318/563;
360/77; 364/183; 364/184; 364/400
[58] Field of Search ............... 364/159, 184, 186, 400,
364/183; 318/560–566, 490, 626; 340/648;
371/24, 25, 27, 71; 360/77, 78, 72.2

[56] References Cited

U.S. PATENT DOCUMENTS

| | | | |
|---|---|---|---|
| 3,149,270 | 9/1964 | Smyth et al. | 364/159 X |
| 3,462,662 | 8/1969 | Carpenter | 364/184 X |
| 3,624,479 | 11/1971 | Callas | 318/565 |
| 3,932,738 | 1/1976 | Hauber et al. | 371/29 X |
| 4,263,580 | 4/1981 | Sato | 364/186 X |

FOREIGN PATENT DOCUMENTS 2158729 5/1973 Fed. Rep. of Germany .
2221866 11/1974 France .

Primary Examiner—Joseph F. Ruggiero
Attorney, Agent, or Firm—David G. Rasmussen; Kevin R. Peterson; Edmund M. Chung

[57] ABSTRACT

A servomechanism avoids load-damaging conditions by being shut down whenever a power-amplifier saturation detector fails to detect a change in the saturation state of the power amplifier in response to the periodic and momentary replacement of the demand signal by one or other of two test signals, which of the two test signals is selected being dependent upon the expected direction of possible saturation of the power amplifier and the polarity of both test signals being the same as the polarity of the applied demand signal.

16 Claims, 3 Drawing Figures

SERVOMECHANISMS

This is a continuation-in-part of application Ser. No. 324,351, filed as PCT GB 81/00202, Sep. 24, 1981, published as WO 82/01264, Apr. 15, 1982 102(e) date Nov. 17, 1981, abandoned.

BACKGROUND OF THE INVENTION

1. Field of the Invention

The present invention relates to a servomechanism for controlling an output in response to a demand signal by the substraction therefrom of a feedback signal and the application of the difference therebetween as the input to a load driving poor amplifier, and it is an object of the invention to provide a servomechanism which is protected, by being shut down, in the event of the loss of the feedback signal, or overloading of its output.

2. The Prior Art

While the invention is hereinafter described in relation to a servomechanism for positioning a read/write transducer in a disc data store, it is to be understood that this represents an example of and not a limitation on its use.

It is well knwon to employ a feedback servomechanism for radially positioning a read/write transducer over a rotating disc in a disc data store. The transducer is generally expensive, fragile, and intolerant of collision with the endstops which define the limits of its positioning range.

In the event of a failure of the feedback transducer signal, occasioned by such easily and cheaply remedied faults as a poor electrical connection thereto, the end of life of a light bulb, or the failure of a photocell, the power amplifier in the servomechanism responds only to the input demand signal, applies uncontrolled accelerating energy to the read/write transducer, and thereby necessitates the replacement of the read/write transducer subsequently to its destruction by single or repeated collision with its endstops.

While it is possible to arrange, in the operation of such a servomechanism, that the power amplifier should not remain in saturation for longer than a pedetermined period dictated by the frequency response and damping factor of the servomechanism, and to arrange to monitor the output of the power amplifier and to disable it should it remain in any one sense of saturation for longer than said predetermined period, there are circumstances where it is advantageous and desirable to arrange that the power amplifier should remain saturated for periods in excess of those consistent with servomechanism protection should the servomechanism happen to be out of control, and where such a scheme would be inappropriate. Such a set of circumstance arises when a head positioning servomechanism in a disc file is switched into velocity-controlled mode in order to execute the gross part of the movement of the head between data storage tracks. In order to minimise the transit time it is desirable to arrange that the power amplifier provides maximum accelerating and braking power to the load, thereby remaining near saturation for a time consistent with imparting a considerable potentially destructive velocity to the head. In order to prevent auto-induced velocity ringing in the load, it is also advantageous to arrange that the damping factor of the servomechanism is greater than unity, a state of affairs which also inhibits reversal of saturation polarity in the power amplifier.

SUMMARY OF THE INVENTION

The present invention consists in a feedback servomechanism wherein the demand signal is repetitively replaced by a selectble one of either a first test signal or a second test signal, wherein the duration of each instance of said replacement is such that the drive to the load is substantially unchanged by said replacement, wherein the interval between successive replacements is shorter than the time required for said load to aquire a potentially destructive amount of energy in the event of the feedback signal being lost, wherein said first and said second test signals are of the same polarity as said demand signal, wherein said first test signal is sufficiently large to saturate the output of said power amplfier when applied in place of said demand signal in the absence of said feedback signal, wherein said second test signal exceeds the maximum level of demand to be applied to said servomechanism by an amount sufficient to saturate the output of said power amplifier if applied in place of said demand signal in the absence of said feedback signal, wherein the output of said power amplifier is monitored by a saturation monitor, wherein said first test signal or said second test signal are selected to replace said demand signal dependently upon the potential direction of saturation of said output of said power amplifier resulting from the direction of change of said demand signal, and wherein said power amplifier is prevented from delivering energy to said load in the event of said monitor failing to detect a change in the state of saturation of said output of said power amplifier in response to each instance of said replacement.

BRIEF DESCRIPTION OF THE PREFERRED EMBODIMENT

In a preferred embodiment a feedback servomechanism for positioning a recording and/or replay head in a disc data store comprises a demand signal source and a demand controller. The demand signal source preferably provides a demand signal to the demand controller. The demand is preferrebly provided to the controller in the form of a plural, parallel binary digit word, in which case the controller preferably comprises a digital-to-analog convertor whose output is coupled as the input to said servomechanism. The controller preferably comprises a first test signal generator. The controller also preferably comprises a second test signal generator. The controller yet further preferably comprises a multiplexer. The multiplexer is preferably in receipt of said demand word, the output of said first test signal generator, and the output of said second test signal generator as first, second and third signal inputs respectively. Said demand signal source preferably provides, to said controller, a logical signal whose polarity is indicative of the direction of change of magnitude of the demand signal. Said controller preferably provides a first selection signal to said multiplexer in response whereto said multiplexer preferably provides, as output, said demand signal when said first selection signal is in a first logical state and one or other of said first and second test signals when said first selection signal is in a second logical state. Said controller preferably provides said logical signal from said source as a second selection signal to said multiplexer. Said multiplexer preferably responds to said second selection signal by, when said first selection signal is in said second logical state, by providing as output, said first test signal when said second selection signal is in a first logical state and said second test signal when said second selection signal is in a second logical state. When said demand signal is in the form of said parallel binary digit demand word, said first and second test signal generators preferably provide said first and second test signals in the form of first and second parallel binary digit test words respectively. Said controller preferably responds to the polarity of the demand signals by making the polarity of the test signals applied to the servomechanism the same. The parallel binary digit test word preferably comprises a sign indicating bit directly coupled to the digital-to-analog convertor. The digital-to-analog convertor preferably has, coupled as its input, the output of said multiplexer. The sign bit preferably controls the polarity of the output of the digital-to-analog convertor irrespectively of whether said demand word or one or other of said test words is applied to the input of the digital-to-analog convertor. The first test word is preferably the smallest binary number which, when applied to the input of the digital-to-analog convertor, causes it to provide an analog output signal which would be sufficient to cause the power amplifier of the servomechanism to saturate if the sevomechanism were to lose its feedback signal. The demand word from the demand source preferably has an upper limit. The second test word preferably is that binary word which is greater than the maximum demand limit by an amount which causes the digital-to-analog convertor to produce a difference in output between when said maximum demand word is provided as its input and when said second test word is prvided as its input such that said difference in output, if applied alone in place of the demand signal to the servomechanism, in the absence of the feedback signal of the servomechanism, would cause the output of the power amplifier of the servomechanism to saturate.

The output of the power amplifier is preferably provided as the input to a monitor. The monitor preferably monitors the state of saturation of the output of the power amplifier. The monitor preferably provides a fault indication whenever the state of saturation of the output of the power amplifier fails to change for each instance of replacement of the demand signal by one or othe of the test signals. The monitor preferably comprises a first comparator for indicating when the output of the power amplifier exceeds a first limit close the first saturation level of the amplifier output. The monitor preferably comprises a second comparator for indicating when the output of the power amplifier exceeds a second limit close to a second saturation level of the amplifier. The monitor preferably comprises a logic circuit for indicating when the output of one or other of the comparators changes indicatively of an alteration in the state of saturation of the output of the power amplifier. The monitor preferably comprises a latch which is settable in the event of the logic circuit providing no output in response to the application of a test signal. The latch is preferably externally resetable. The state of the latch is preferably provided as the output of the monitor.

The output of the monitor preferably inhibits the the power amplifier from providing energy to the load whenever the latch is triggered by the logic circuit. The prevention of energy transfer is preferably achieved by means of a selectaby energisable relay for disconnecting the output of the power amplifier from the load, in which case the controller preferably comprises a relay driving circuit.

The controller preferably replaces the demand word with one or other of the test words at regularly repetetive intervals, in which case the controller preferably comprises a repetetively cycling timer. The monitor preferably comprises a timer which is retriggered for each instance of alteration of the state of saturation of the output of the power amplifier, and it is preferably a prerequisite condition for the maintainence of coupling between the output of the power amplifier and the load that the timer in the monitor is constantly in the process of executing a timing operation. The regularly repetetive timer in the controller preferably provides a short output pulse at the end of each timing cycle, which output is preferably coupled as the first selection signal to the multiplexer.

When the delivery of energy from the power amplifier to the load is inhibited, the load is preferably braked.

Once the delivery of energy to the load is inhibited, the inhibition is preferably maintained until re-established by external intervention.

The invention is further explained, by way of an example, by the following description in conjunction with the appended drawings, in which;

DETAILED DESCRIPTION OF THE PREFERRED EMBODIMENT

Figure 1:
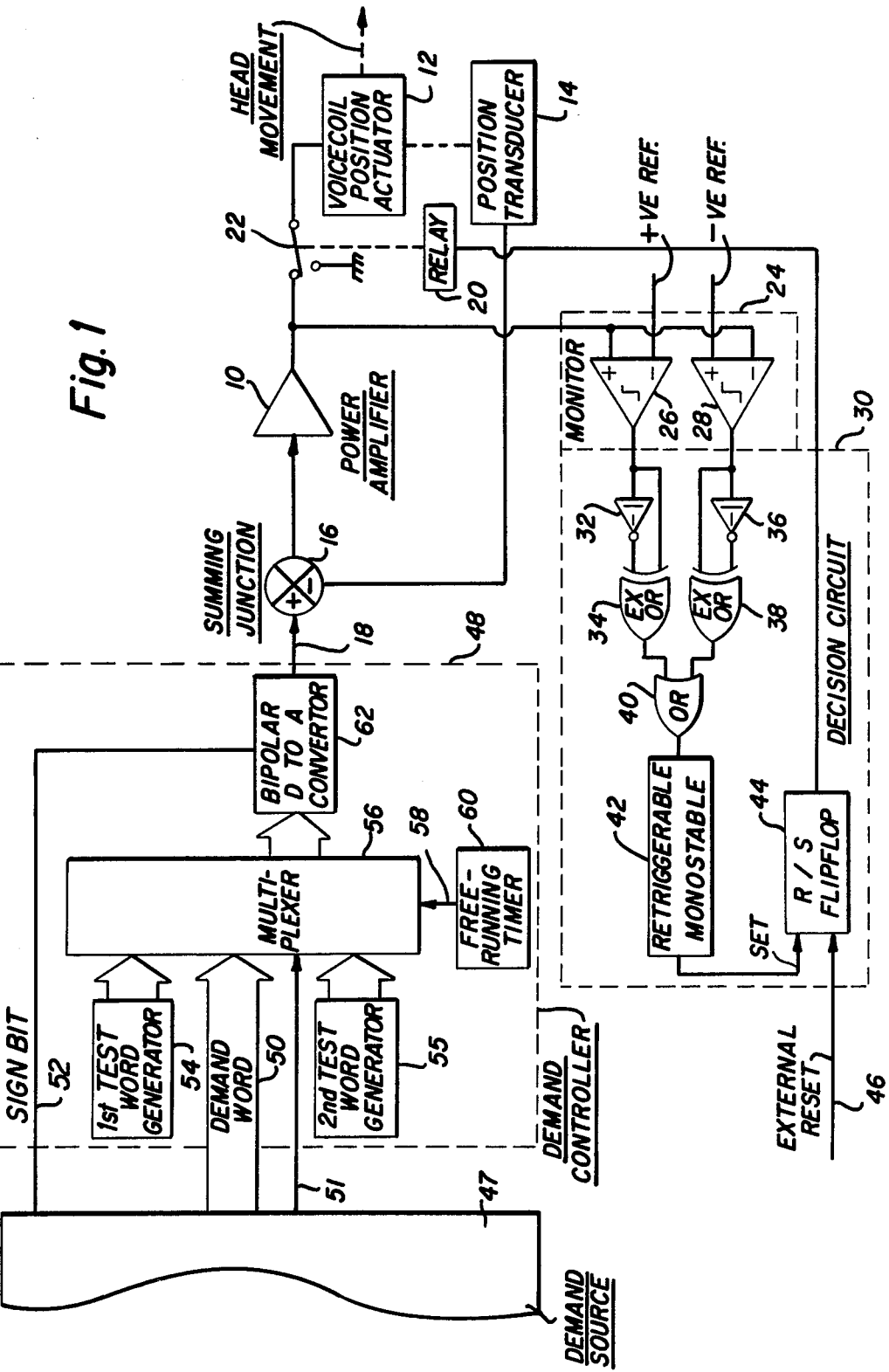
FIG. 1 shows, in schematic form, the preferred embodiment of the present invention.

FIG. 1 shows a schematic diagram of the preferred embodiment of the present invention.

A head positioning servomechanism, for controlling the radial position of a magnetic read/write head in adjacence to the surface of a rotating, magnetic, data storage disc, of a kind well known in the art, comprises a power amplifier 10, a voicecoil positional actuator 12 whereto the head to be positioned is mechanically coupled, a position transducer 14 monitoring the radial position of the head and a summing junction 16. The voicecoil actuator 12 comprises a cylindrical coil of wire in a radial magnetic field. The coil is mechanically coupled to the head and the head therefore experiences a displacing force in sympathy with current flowing in the coil. The position transducer 14 is mechanically coupled to the read/write head and provides an output signal which is selectably either indicative of the radial position on the rotating disc of the head or of the radial velocity of the head across the disc. For the purposes of description of the invention, it is to be assumed that the position transducer 14 is selected to give, as its output, a signal proportional to the velocity of the head. The output of the transducer 16 is coupled as the subtractive input to the summing junction 16. The velocity demand signal is coupled as the additive input to the summing junction 16 via the demand coupling 8. The output of the summing junction 16 is the difference between its additive and subtractive inputs and is coupled, as an error signal, to the input of the power amplifier 10. The power amplifier 10 provides an amplified representation of its input as the motive energy to the coil in the actuator 12.

The servomechanism may be compensated, for stability, preferably in its feedback path via the transducer 14, but acceptably in the power amplifier 10, or via a combination of part compensation in both.

If the transducer 14 had been selected to give a head position indicating output, then the servo loop would be a position controlling loop as opposed to the velocity controlling loop described. Either kind of loop may be the subject of the present invention. The servomechanism need not be part of a disc file, but may be part of any apparatus requiring that the servomechanism be shut down in the event of failure.

A selectably energisable relay coil 20 controls a switch 22. When the relay coil 20 is not energised, the output of the power amplifier 10 is coupled to the actuator 12. When the relay coil 20 is energised the actuator 12 is shortended such that the kinetic energy which the read/write head possesses is electrically dissipated by the current induced by the radial magnetic field in the actuator coil, the actuator coil being disconnected from the power amplifier 10.

The output of the power amplifier 10 is coupled as the input to a monitor 24. The monitor 24 comprises a first comparator 26 for detecting positive saturation in the output of the power amplifier 10 and a second comparator 28 for detecting negative saturation in the output of the power amplifier 10.

The output of the power amplifier 10 is coupled to the non-inverting input of the first comparator 26 and a positive reference voltage +VE REF is coupled to the inverting input of the first comparator 26. The positive reference voltage +VE REF is a little less than the positive saturation voltage of the power amplifier 10. The first comparator 26 thus gives a logically true output whenever the power amplifier 10 is at or near positive saturation.

The output of the power amplifier 10 is coupled as the inverting input to the second comparator 28 and a negative reference voltage −VE REF is coupled to the non-inverting input of the second comparator 28. The negative reference voltage −VE REF is a little less negative than the negative saturation output level of the power amplifier 10. The second comparator 28 gives a logically true output whenever the outut of the power amplifier is at or near negative saturation.

It is to be appreciated that other schemes exist for the detection of saturation. The power amplifier 10 need not have a bidirectional output, in which case it is only necessary to detect whether its output is either saturated or not saturated.

The outputs of the first and second comparators 28,26 are coupled as the inputs to a decision circuit 30. A combination of a first inverter 32 and a first exclusive OR gate 34 provides a short, logically true pulse on the output of the first exclusive OR gate 34 whenever the outut of the first comparator 26 passes from logically true to logically false or passes from logically false to logically true.

A combination of a second inverter 36 and a second exclusive OR gate 38 provides a short, logically true pulse on the output of the second exclusive OR gate 38 whenever the output of the second comparator 28 passes from logically true to logically false or passes from logically false to logically true.

The output of the first exclusive OR gate 34 and of the second exclusive OR gate 38 are provided as inputs to an OR gate 40 which, provides, as its output, a short, logically true pulse whenever the output of the power amplifier 10 passes into or out of positive or negative saturation.

The output of the OR gate 40 is provided as the triggering input to a retriggerable monostable timer 42. Whenever the monostable 42 receives a triggering pulse it commences a timing operation. During a timing operation the monostable 42 provides a logically true output. If a further triggering pulse is received before the end of the timing operation, the timing operation is recommended and the output of the monostable 42 remains logically true. If a triggering pulse is not received before the end of a timing operation the output of the monostable 42 reverts to logically false. Thus, provided the monostable 42 is supplied with triggering pulses before the end of each timing operation its output will remain logically true.

The output of the monostable 42 is provided as the setting input to an R/S flip flop 44. An external reset signal is provided to the flip flop 44 via a reset line 4. The flip flop 44 is set whenever the signal from the output of the monostable 42 is logically false, and reset whenever the signal on the external line 46 is logically false. Whenever the flip flop 44 is set it provides a logically true output signal, and whenever it is reset it provides a logically false output signal.

The output of the flip flop 44 is coupled, via a power driver, not here shown, to the relay coil 20, such that whenever the output of the flip flop 44 is logically true, the relay coil 20 is activated and the switch 22 disconnects the actuator 12 from the output of the power amplifier 10 and shorts out the actuator coil 12, but when the output of the flip flop is logically false, the relay coil 20 is not activated and the switch 22 connects the output of the power amplifier 10 to the actuator 12.

A velocity demand signal is provided by a demand source 47 to a demand controller 48 via a demand signal bus 50. The controller 48 in turn supplies the velocity signal on the demand coupling 18 to the positive input of the summing junction 16.

The demand source 47 also provides a signal indicative of the expected direction of saturation of the power amplifier 10 in response to the signals on the demand bus 50. The saturation indicating signal has a logical state determined by the direction of change of the magnitude of the signal provided on the demand bus 50. If the magnitude of the demand is increasing or unchanging, the saturation signal on the saturation line 51 is logically true, and if the magnitude is decreasing the saturation signal on the saturation line 51 is logically false.

The demand source 47 provides the demand signal on the demand bus 50 in the form of a seven parallel binary digit demand word arranged in the form of a conventional binary number whose size is indicative of the required velocity of the head. The demand source 47 also provides the demand controller 48 with a sign-indicating binary digit on the sign line 52. Whenever the signal on the sign line 52 is logically true the demand word on the demand bus 50 is taken as being positive and whenever the sign bit on the sign line 52 is logically false the demand word on the demand bus 50 is taken as being negative, the sign bit on the sign bus 52 thereby being indicative of the required direction of movement of the actuator 12 and of the head.

The controller 48 comprises a first test word generator 54 providing, as output, a first seven parallel binary digit test word. The controller 48 further comprises a second test word generator 55 providing as output a second, seven parallel binary digit test word. The seven parallel binary digit demand word on the demand bus 50 is coupled as a first signal input to a multiplexer 56. The output of the first test word generator 54 is coupled as a second signal input to the multiplexer 56. The output of the second test word generator 55 is coupled as a third signal input to the multiplexer 56.

The controller 48 provides a first selection signal to the multiplexer 56 on a first selection line 58. When the signal on the first selection line 58 is logically true the multiplexer provides, as its output, the seven parallel binary digits from the demand bus 50. When the signal on the first selection line 58 is logically false the multiplexer 56 provides as its output a selectable one or other of the first and second test words from the first and second test word generators 54,55 respectively.

A free-running timer 60 provides its output as the first selection signal to the multiplexer 56. The output of the timer 60 is a repetetive pulsed logic signal consisting of one hundred microsecond logically false pulses repeated every five milliseconds, the output of the timer 60 being logically true between the pulses. In response to the output of the timer 60 the multiplexer 56 provides as its output 4.9 millisecond periods of the demand signal on the demand bus 50 followed by 100 microsecond periods of one or other of the test words.

The saturation indicating signal on the saturation line 51 is provided as the second selecting input to the multiplexer 56. The second selection signal determines whether the first or second test word is to be provide as the output of the multiplexer 56 when the signal on the first selection line 58 is logically false. When the signal on the saturation line 51 is logically true, indicating that the magnitude of the demand word on the demand bus 50 is rising or unchanging, the multiplexer provides as its output, whenever the signal on the first selection line 58 is logically false, the seven parallel binary digits of the first test word from the first test word generator 54. When the signal on the saturation line 51 is logically false, indicating that the magnitude of the demand word on the demand bus 50 is falling, the multiplexer 56 provides, as its output, whenever the signal on the first selection line 58 is logically false, the seven parallel binary digits of the second test word from the second test word generator 55.

The output words of the multiplexer 56 are coupled as the magnitude determining input to a bipolar digital-to-analog convertor 62. The sign line 52 is coupled as the sense determining input to the digital-to-analog convertor 62. The convertor 62 in response to these inputs provides as output an analog level proportional in magnitude to the seven bits of the output binary number from the multiplexer 56 which is positive if the signal on the sign line 52 is logically true and negative if the signal on the sign line 52 is logically false. The analog output level of the convertor 62 is provided as the input to the demand coupling 18 going to the additive input of the summing junction 16.

The size of the first test word from the first test word generator 54 is equal to or greater than the least binary number which, when applied to the input of the convertor 62, causes the convertor 62 to provide an analog output which is sufficiently large to cause the output of the power amplifier 10 to saturate should the feedback signal from the transducer 14 be disconnected from the inverting input to the summing junction 16.

The demand source 47 provides a demand word on the demand bus 50 which has an upper limit less than the largest binary word which the convertor 62 can respond to. The upper limit to the demand is the maximum demand word.

The second test word, from the second test word generator 55, is a binary number equal to or greater than the least binary number in excess of the maximum demand word which causes the convertor 62 to provide an increment of output over the analog output it provides in response to the maximum demand word which is sufficiently large that, should the increment of analog output be provided alone on the demand coupling 18 with the feedback signal from the transducer 14 disconnected from the subtractive input of the summing junction 16, the output of the power amplifier 10 saturates. This means that the second test signal is capable of causing the output of the power amplifier 10 to saturate even if the convertor 62 is supplying the maximum analog demand level, should the feedback signal from the transducer 14 fail for any reason.

The particular repetition period for the test signals is a matter of design choice. The frequency is chosen such that resonances in the servomechanism are not excited. The repetition period is such that the actuator 12 cannot pick up enough velocity between applications of the test words to damage the head should a subsequent collision with an endstop of suchlike occur. This will of course vary from system to system. The value for the preferred embodiment of the present invention was chosen as representative of a range of suitable values for use in a medium speed head positioner in a disc file.

The duration of each application of one or other of the test words is also a matter of design choice. In the particular example of the preferred embodiment the duration of each application for 0.1 millisecond every 5 milliseconds is such that in the worst case the average level of demand can only be upset by the test word or words by some 2%. It may be desirable to reduce the impact of the test words still further by making them relatively shorter with respect to the repetition interval.

The duration of each application of the test word or words is also kept short to prevent significant change of current in the load 12. The inductance of the voicecoil 12 opposes any change in current therethrough. Very short pulse changes in the output voltage of the power amplifier therefore fail to have a significant effect on the coil current. The shorter the pulses the less the impact.

In the case of the preferred embodiment it is taken that the gain of the power amplifier 10 is very high and the first test word is therefore the seven bit binary number 0000001, this being large enough to evoke a sufficient output from the convertor 62 to saturate the output of the power amplifier 10 if the feedback fails. In other systems the amplifier may not have so much gain and a larger binary number will be chosen. It is preferred that the first test word be the least binary number to saturate the amplifier 10, but any number larger than the least number will suffice, conditionally upon the impact that its magnitude will have upon the average demand levels.

In the present example, with the gain of the amplifier being high, the maximum demand level is chosen as the seven bit binary number 1111110 and the second test word is chosen as 1111111. The difference between the two is the number 0000001 which, as stated before, when used as the first test word, is enough to saturate the amplifier. The second test word is therefore sufficiently greater than the maximum demand word to assure saturation of the power amplifier 10 output in the event of the failure of feedback when the maximum demand is being applied.

If the gain of the amplifier 10 had been less the difference between the maximum demand word and the second test word would have had to have been greater in proportion to the reduction in gain. It is preferred that the difference between the maximum demand word and the second test word is the minimum consistent with saturating the output of the amplifier 10 in the event of the failure of feedback, but it is acceptable to use any pair with a greater difference provided due account is taken of the impact upon mean demand levels.

Those skilled in the art will be aware that it is possible to scale the actual demand words on the demand bus, 50, either before or after application thereto, to compensate for the application of the test words and to render the levels of demand experienced by the servomechanism on average unaltered by the test words.

Figure 2A:
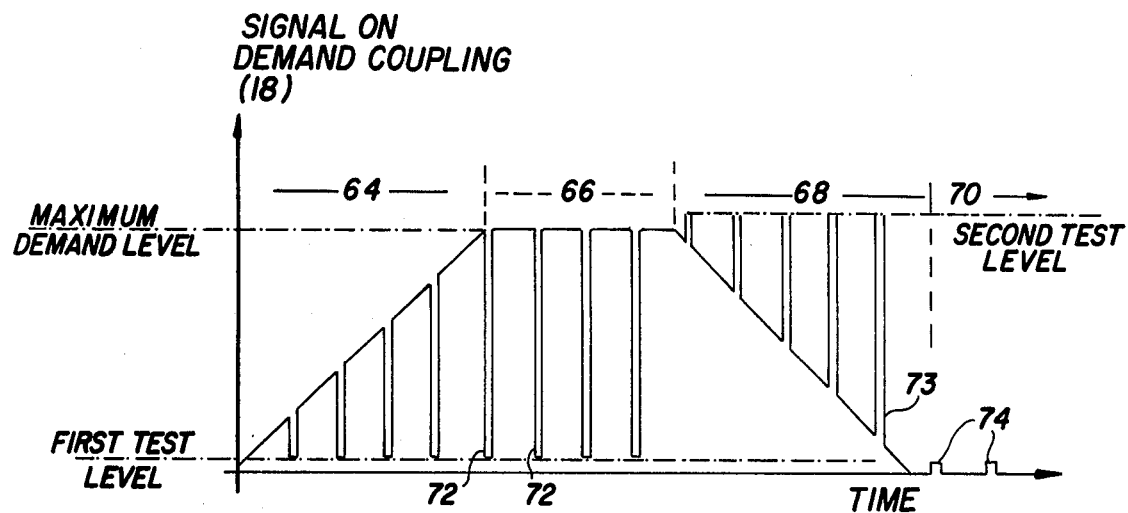
FIG. 2A shows an exemplary demand waveform applicable to control the load of FIG. 1.

FIG. 2A shows, by way of an example, a voltage waveform such as might be found on the demand coupling 18.

The waveform chosen is of no particular significance save that it illustrates all possible modes of operation of the present invention. It in fact shows a manner of transferring the head in a disc file from radial adjacence to one track on a rotating disc to radial adjacence to another track.

During an acceleration period 64 the demand source 47 applies a steadily increasing binary number to the demand bus 50 whose magnitude is indicative of the required, increasing velocity of the actuator 12 and therefore of the head.

Since the magnitude of the demand word is is increasing, the demand source 47 makes the signal on the saturation line 51 logically true. The multiplexer 56 therefore selects, whenever the signal from the free-running timer 60 is logically false, the output of the first test word generator 54 to be provided as the input to the digital-to-analog convertor 62.

During a cruising period 66, when the demand word on the demand bus 50 has reached its maximum value, the demand word stays constant and the actuator 12 and the head are caused to move at a steady speed.

In the cruise period 66 the demand stays steady and the demand source 47 therefore causes the signal on the saturation line 51 to be logically true, thereby causing the multiplexer 56 to select the output of the first test word generator 54 for presentation as the input to the convertor 62 whenever the output of the free-running timer 60 is logically false.

During a deceleration period 68 the actuator 12 and therefore the head are brought to rest. The demand word on the demand bus 50 is steadily reduced indicatively of the steadily reducing required velocity of the head. Since the demand word is reducing the demand source 47 causes the signal on the saturation line 51 to be logically false. The multiplexer 56 responds by selecting the output of the second test word generator 55 to be presented as the input to the digital-to-analog convertor 62 whenever the signal from the free-running timer is logically false.

During a rest period 70 the actuator 12 and therefore the head is stationary, the traverse from track to track across the disc surface having been completed. The demand word on the demand bus 50 remains constant at zero indicatively of the zero required velocity of the head. Since the magnitude of demand is constant, the demand source 47 causes the signal on the saturation line 51 to be logically true. In response to the logical polarity of the signal on the saturation line, the multiplexer 56 selects the output of the first test word generator 54 to be the input to the digital-to-analog convertor 62 whenever the signal from the free-running timer 60 is logically false.

During the acceleration period 64 and the cruise period 66 the seven-bit binary number from the multiplexer 56 jumps from the seven-bit demand word on the demand bus 50 to the first test word from the first test word generator 54 whenever the output of the free-running timer 60 pulses logically false for 100 microsecond periods repeated every 5 milliseconds. This causes a succession of downward-magnitude spikes 72 in the analog voltage provided to the additive input of the summing junction 16, the spikes 72 reaching to the first test level.

During the deceleration period 68 the seven-bit binary number from the demand source 47 on the demand bus 50 is replaced for 100 microsecond periods repeated every 5 milliseconds as the output of the multiplexer 56 by the second test word from the second test word generator 55 whenever the output of the free-running timer 60 pulses logically false. This causes the output of the digital-to-analog convertor 62 to display a succession of upward magnitude voltage spikes 73, reaching to the second test level. The second test level has a greater magnitude than maximum demand level, which is the largest demand signal that the demand source 47 can apply indicatively of the required velocity of the head.

During the rest period 70 the zero demand word on the demand bus 50 is replaced as the output of the multiplexer 56 by the output of the first test word generator 54 whenever the output of the free-running timer 60 pulses logically false for 100 microsecond periods repeated every 5 milliseconds. This causes a succession of small upward magnitude spikes 74 to appear at the analog output of the digital-to-analog convertor 62 which reach to the first test level and which are applied to the additive input of the summing junction 16.

Figure 2B:
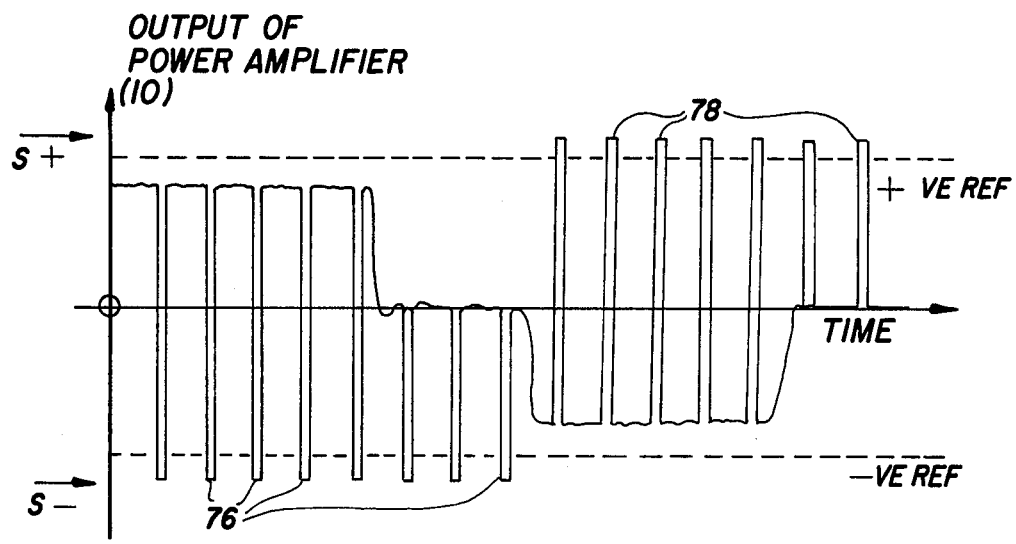
FIG. 2B shows the power amplifier output waveform generated in response to the demand waveform of FIG. 2A.

FIG. 2B shows an exemplary time-voltage waveform of the output of the power amplifier 10 generated in response to the exemplary signal applied to the additive input of the summing junction 16 illustrated in FIG. 2A, and having the same horizontal time axis as FIG. 2A.

During the acceleration period 64 the output of the power amplifier 10 rises positively towards or even reaches a positive saturation level S+. In so doing energy is supplied to the actuator 12 tending to accelerate it. The increasing velocity of the actuator 12 is reflected in the increasing output of the transducer 14 and the action of the power amplifier 10 is to reduce the difference between the output of the digital-to-analog convertor 62 and the output of the transducer 14 towards zero. Provided the signal from the transducer 14 is present, the output of the summing junction 16 is small, even if it succeeds in saturating the power amplifier 10 output. When the output of the free-running timer 60 goes logically false and the demand signal from the demand bus 50 is replaced by the first test word from the first test word generator 54, the feedback signal from the transducer 14 representative of the speed of the actuator 12 is still present. The feedback signal is substantially equal to the previously-applied speed demand signal. The difference between the previously-applied demand signal and the first test signal is more than enough to drive the power amplifier 10 out of positive saturation into negative saturation. In so passing from saturation to saturation, the output voltage of the power amplifier 10 can pass through the positive reference voltage +VE REF and through the negative reference voltage −VE REF to alter the output states of the first comparator 26 and of the second comparator 28 and retrigger the timer 42. Alternatively, in cases of greater saturation, the output of the power amplifier 10 can merely pass out of positive saturation but never attain negative saturation. In passing through +VE REF the first comparator 26 is fired by the change in the output voltage of the power amplifier 10 and the timer 42 is retriggered. In yet another possible situation, the output of the power amplifier 10 may not be saturated in response to the acceleration demand reflected by the demand word on the demand bus 50. In this case, the downward magnitude spikes 72 cause negative saturation of the output of the power amplifier 10. The output voltage of the power amplifier passes through the negative reference level −VE REF and alters the state of the output of the second comparator 24, so triggering the timer 42. In FIG. 2A the negative excursions of the output of the power amplifier in response to the downward-magnitude spikes 72 are shown as a succession of negatively saturating output pulses 76. It is to be understood however that the negative excursions can be in any one of the three described manners. In general, in the efficient operation of a positioning servomechanism, all three situations arise during an acceleration phase. At first deep saturation is encountered when the load is stationary but the demand voltage has suddenly increased, then shallow saturation is encountered as the velocity of the load begins to catch up with the demand velocity, and lastly a state of non-saturation is encountered as the velocity of the load catches up with and perhaps rings through the demanded velocity. The operation of the preferred embodiment is thus seen to accomodate all situations encountered during a normal load acceleration.

Should the feedback signal from the transducer 14 be lost to the subtractive input of the summing junction for any reason, then the demand signal alone will be applied to the input of the power amplifier 10, without the moderating influence of the feedback signal, thereby driving the power amplifier 10 into hard positive saturation. The first test signal is of the same polarity as the demand signal, so that when it is applied in place of the demand signal, all it does is to keep driving the power amplifier 10 into positive saturation. The state of saturation of the output of the power amplifier 10 therefore does not change, the state of the output of neither the first comparator 26 nor of the second comparator 28 is changed, the timer 42 is not retriggered and times out setting the latch 44, and the output of the power amplifier 10 is disconnected from the actuator 12 by the switch contacts 22 operated by the relay coil 22.

During the cruise period 66 the actuator 12 has attained substantially uniform velocity. All that the power amplifier 10 is required to do is supply sufficient energy to overcome windage, eddy current and friction losses in the load. The output of the power amplifier therefore falls to a little above zero (on average). Once again the feedback voltage from the transducer 14 substantially equals the demand voltage from the digital-to-analog convertor 62. When the free-running timer 60 gives its 100 microsecond logically false pulse every 5 milliseconds, and the multiplexer provides the output of the first test word generator 54 in place of the demand word from the demand bus 50, a downward spike 72 of analog voltage is received on the additive input to the summing junction, which, being so far different from the original demand voltage, and therefore from the feedback voltage from the transducer 14, forces the output of the power amplifier hard towards negative saturation, so passing through the −VE REF level, triggering the second comparator 28 and retriggering the timer 42.

Had the feedback signal from the transducer 14 been lost for any reason, the output of the digital-to-analog converter 18 would have been unmodified and, being applied directly to the input of the power amplifier 10, would have driven the output of the power amplifier into hard, postive saturation. The downward magnitude test spikes 72, being of the same polarity as the demand signal, would meely continue to drive the power amplifier output into positive saturation and neither of the comparators 26,28 would be triggered. Accordingly, the timer 42 would not be retriggered, the latch 44 would be set, and the switch 22 be operated by the relay coil 20 to disconnect the output of the power amplifier 10 from the actuator 12.

During the deceleration period 68 the power amplifier 10 is required to counter the kinetic energy of the actuator 12 by supplying it with energy in the opposite sense to that it supplied in the acceleration period 64. The output of the power amplifier 10 therefore tends towards negative saturation. The output may reach the negative saturation level S-31, may enter hard saturation, or may never attain full saturation. While in FIG. 2B the output of the power amplifier 10 is shown as never attaining full saturation, it is to be appreciated that saturation is possible and, just as in the case of acceleration, a period of hard negative saturation may be followed by a period of light saturation and a period of no saturation.

At the very beginning of the deceleration period 68 the demand is right at the maximum level. If the second test signal from the second test signal generator 55 is then applied as the output of the multiplexer 56 to be the input of the digital-to-analog converter 62, in response to the output of the free-running timer 60 providing a 100 microsecond duration logically false pulse, an upward magnitude spike 73 is produced which still succeeds in altering the state of saturation of the power amplifier 10 since it exceeds the maximum demand level. Once again feedback must be present, or else the demand signal drives the power amplifier 10 hard into positive saturation which saturation is merely maintained by the second test signal of the same polarity as the demand. Once again, dependently upon the extent of saturation of the output of the power amplifier 10, just as in the case of acceleration, the upward-magnitude test spikes 73 can drive the output of the power amplifier from hard negative right through to hard positive saturation thereby triggering both comparators 26,28 and retriggering the timer 42 twice, the test spikes 73 can drive the output of the power amplifier from negative saturation into the linear zone thereby triggering the second comparator 28 and retriggering the timer 42 once, or the upward-magnitude test spike 73 can drive the output of the power amplifier 10 from nonsaturated linear operation into positive saturation, thereby triggering the first comparator 26 and retriggering the timer 42 once.

During the rest period 70 the demand word on the demand bus 50 is zero. The analog demand signal provided by the digital-to-analog converter 62 to the input of the summing junction 16 is therefore also zero. When the free-running timer 60 provides its logically false 100 microsecond duration pulse repeated every 5 milliseconds, to the input of the multiplexer 56 and the multiplexer 56 responds by providing the output of the first test word generator 54 as the input to the convertor 62, the small upward amplitude test spikes 74 so produced have the effect of causing positive saturation peaks 78 in the output of the power amplifier 10, so triggering the first comparator 26 and retriggering the timer 42.

It is to be appreciated that in this last instance of zero demand it little matters what is the polarity of the test spikes, either a positive or negative going spike producing a change of output saturation. In the preferred embodiment the same direction as last demand was chosen for convenience of implementation. Those skilled in the art will perceive the manner in which a reversal of test spike direction might be achieved. The demand controller 47 can be made to alternate the logical state of the signal on the saturation line 51 in response to the output of the free-running timer 60 as to achieve a zero mean level of demand despite the application of the test spikes.

In the preferred embodiment the period of the triggered timer 42 is made between one and two times the period of the free-running timer 60. In this way, the the retriggerable timer 42 times out if just one test spike 72,73,74 fails to trigger one, the other or both of the comparators 26,28 indicatively of an alteration of the state of saturation of the output of the power amplifier having been produced. It is to be appreciated that the period of the triggerable timer 42 can be made longer so that it will only time out if more than a predetermined number of consecutive test spikes 72,73,74 fail to evoke an alteration of saturation state of the power amplifier 10 output. In this case it is to be appreciated that the predetermined number of test spikes 72, 73, 74 should be applied in a period shorter than that required for the power amplifier 10 to apply potentially load-destructive amounts of energy to the actuator 12.

The monitoring for saturation changes can be achieved other than with a triggerable timer. Those skilled in the art will perceive that a logic circuit responding to the output of the comparators 26,28 and to an indication of a test spike having been applied, could fulfil the same function. If power removal after the failure of a predetermined number of consecutive test spikes 72,73,74 is to be employed, the logic circuit could comprise a counter which is reset every time a change of saturation is perceived but triggers a latch if a count equal to the predetermined number of test spikes is reached.

The preferred embodiment here described refers first and second test words commensurate with detecting a failure of feedback signal in a servomechanism. It is to be appreciated that the test levels can be chosen so as to indicate other fault conditions in addition to detecting the loss of feedback. If for any reason the actuator 12 were to become sluggish in response to the application of energy, then the power amplifier would enter very hard saturation at the beginning of acceleration and judicious selection of test spike size would enable the detection of this state. Similarly, excessive friction would cause the hard saturation of the amplifier 10 and be detectable.

The preferred embodiment has shown a protection system with two sizes of test spike. It is to be appreciated that one, two or more sizes of test spike may be employed using a corresponding number of test signal generators to test the output of the power amplifier 10 for different levels of loading at different times. A range of test voltages can be applied to a range of comparators to give finer indication of the power-amplifier's response than is provided by a saturated-or-not response from the monitor.

While in the preferred embodiment a hard-wired circuit has been described encompassing the activites of the logic elements 32,34,36,38,40, 42,44 it is to be appreciated that these activities might be simply incorporated into the activity of a data processing unit.

In the preferred embodiment the demand source 47 has been described as providing a demand profile. The manner of generation of the profile forms no part of the present invention save in the provision of the signal on the saturation line 51. Signal magnitude monitoring means either numerical in nature and examining the number on the demand bus 50 or analog in nature and examining the output of the convertor 62 might be provided to test the demand for rise, fall or stability in magnitude and so provide the required signal on the saturation line 51. The activity of the demand source could be accomodated within the operation of a small data processing unit, in which case that unit could be the same unit incorporating the logic elements 32 to 44 inclusively.

Those skilled in the art will readily conceive of methods of inhibiting the provision of power from the amplifier 10 to the load 12 and of braking the load 12, other than described herein but equally applicable in the present invention.

During those times when demand is zero, the sign bit on the sign line 52 could equally well be true or false without altering in any material way the operation of the invention.

While the invention has been described with reference to head positioning in a data data store, it is lastly to be appreciated that this use is intended to be merely illustrative of and not restrictive to its field of utility.

Additional element can be included in receipt of the condition of the latch 44 and capable of applying the reset signal on the external reset line 46 so that, for example, the external reset signal might be applied up to a predetermined consecutive number of times before it is accepted that there is a servo failure.

The additional circuits or latch 44 might be be used to signal to a remote host system when a failure has occurred. Failure might also trigger audible or visual alarms to alert an operator. The operator can be provided with manually operable means for applying the external reset signal.

What I claim is:

1. A feedback servomechanism for controlling an attribute of a load, said servomechanism comprising:
 a summing junction coupled to receive a control signal as an additive input, coupled to receive a feedback signal indicative of said controlled attribute as a subtractive input, and operable to provide an output representative of the difference between said additive input and said subtractive input;
 a power amplifier, coupled to receive said output of said summing junction as input and operable to provide an output representative thereof, said output of said power amplifier being coupled to said load to alter said attribute for the difference between said feedback signal and said control signal to be moved towards zero;

a test signal generator coupled to monitor an externally provided demand signal and operable to provide, as output, a test signal having the same polarity as said demand signal, said test being of sufficient magnitude to saturate said output of said power amplifier in the absence of said feedback signal;

demand control means coupled to receive said output of said test signal generator as a first input, coupled to receive said externally provided demand signal as a second input and operable to provide, as output, said control signal to said summing junction, where said control signal consists in said demand signal repetitively replaced by said test signal;

monitor means, coupled to monitor the state of saturation of said output of said power amplifier and operable to provide an output indicative of said output of said power amplifier failing to alter its state of saturation in response to said replacement of said demand signal by said test signal as said control signal;-and load drive inhibition means, coupled to receive said output of said monitor means, coupled to control the delivery of energy to said load from said output of said power amplifier, and operable in response to the receipt of said output from said monitor means to cause the cessation of said supply of energy to said load from said output of said power amplifier.

2. A servomechanism according to claim 1 wherein said demand control means are operable to control the duration of each instance of said replacement of said demand signal by said test signal as said control signal such that the energy delivered to said load by said power amplifier is substantially unchanged by said replacement over the energy which would have been delivered thereto had said replacement not occurred, and such that the time between successive replacements is longer that the longest period of saturation of said output of said power amplifier during normal working of said servomechanism but shorter than the time required, in the event of said feedback signal being lost, for said load to acquire a potentially destructive amount of energy.

3. A servomechanism according to claim 2 wherein said demand control means comprises:

a multiplexer coupled to receive said test signal as a first input, coupled to receive said demand signal as a second input, and operable, in response to a command signal, to provide as an output, a selectable one of its said two input signals; and a freely-running timer operable to generate said command signal and to provide said command signal to said multiplexer such that said multiplexer repetitively provides as its output, said test signal for the duration of a first predetermined period followed by said demand signal for the duration of a second predetermined period.

4. A servomechanism according to claim 3 wherein said monitor means comprises:

a sensor, coupled to receive said output of said power amplifier and operable to provide output indicative of each instance of said output of said power amplifier entering or leaving a state of saturation; and a retriggerable timer, coupled to receive said output of said sensor as an input, operable to commence a timing operation for each output indication by said sensor, and operable to provide an output, indicative of whether or not it is in the course of performing a timing operation, the period of said timing operation being equal to or greater than the sum of said first predetermined period and said second predetermined period.

5. A servomechanism according to claim 4 wherein said monitor means further comprise:

a register, operable to be placed in a first state by said output of said retriggerable timer being indicative of said retriggerable timer ceasing to be in the course of performing a timing operation, operable to be placed in a second state by the application of an externally provided servomechanism enabling signal, and operable to provide output indicative of being in said first state, where said output of said register is coupled as said output of said monitor indicative of said output of said power amplifier having failed to alter its state of saturation in response to said replacement of said demand signal by said test signal.

6. A servomechanism according to claim 5 wherein said sensor comprises:

a first comparator coupled to receive said output of said power amplifier as a first input, coupled to receive a first reference level as a second input, and operable to provide a logic output indicative of whether said output of said power amplifier is greater or less than said first reference level.

7. A servomechanism according to claim 6 wherein said sensor comprises:

a second comparator coupled to receive said output of said power amplifier as a first input, coupled to receive a second reference level as a second input, and operable to provide a logic output indicative of whether said output of said power amplifer is greater than or less than said second reference level.

8. A servomechanism according to claim 7, comprising:

a pulse generation circuit coupled to receive said output of said first comparator as a first input, coupled to receive said output of said comparator as a second input, and operable to provide an output pulse for each instance of said output of said first comparator or said output of said second comparator altering its respective indication.

9. A servomechanism according to claim 8 wherein said
inhibitor means comprises:

a switch intermediate between said output of said power amplifier and said load, operable to disconnect said output of said power amplifier from said load in response to the receipt of said indication by said output of said monitor.

10. A servomechanism according to claim 8 comprising:

an energy dissipator, coupled to said load and operable to remove energy from said load in the event of said operation of said switch.

11. A servomechanism according to claim 9 for use in positioning a read/write head assembly in a disc data store, wherein said power amplifier is a voltage amplifier, said load is an electric motor for driving said head assembly, said switch is an electro-magnetic relay, and said energy dissipator is a secondary set of contacts on said relay for shorting out the input terminals of said motor subsequently to the disconnection of said motor from said output of said power amplifier.

12. A servomechanism according to claim 11, wherein said demand signal is a plural parallel binary digit demand word, said test word generator generates said test signal as a plural parallel binary digit test word, and said multiplexer is a digital multiplexer in receipt of said test and demand words and operable to provide a selectable one or other of its said two input words as a multiplexer output word.

13. A servomechanism according to claim 12 wherein said controller comprises a digital-to-analog convertor for receiving said multiplexer output word and for providing as an output, an analog signal proportional to the magnitude of the binary number which said multiplexer output word represents, said output of said convertor being for use as said control signal.

14. A servomechanism according to claim 13 wherein said demand word comprises a sign binary digit indicative of whether the analog signal to be generated by said digital-to-analog convertor is to be of positive or negative polarity, and wherein said digital-to-analog convertor is operable to respond to said binary digit to generate said selectably positive or negative polarity of output, said sign binary digit being coupled to said digital-to-analog convertor independently of said multiplexer for determining the polarity of output to be generated by said convertor in response to said test word.

15. A servomechanism according to claim 14 wherein said plural, parallel binary digit test word is representative of the least binary number which, when applied as said input to said multiplexer, causes said analog signal to be sufficiently large to saturate said power amplifier in the absence of said feedback signal.

16. A servomechanism according to claim 15 wherein said plural, parallel binary digit test word is representative of the least binary number which, when applied as said input to said convertor, causes said analog signal to be sufficiently large to alter the state of saturation of said power amplifier even when said output of said power amplifier is already saturated as a result of supplying up to a predetermined amount of power to said load.

* * * * *

UNITED STATES PATENT AND TRADEMARK OFFICE
CERTIFICATE OF CORRECTION

PATENT NO. : 4,479,177
DATED : October 23, 1984
INVENTOR(S) : Eugenio Berti

It is certified that error appears in the above-identified patent and that said Letters Patent are hereby corrected as shown below:

```
Col.  1, line 55, change "circumstance" to --circumstances--.
Col.  3, line 31, change "prvided" to --provided--.
Col.  3, line 44, change "othe" to --other--.
Col.  4, line 62, change "8" to --18--.
Col.  5, line 17, change "shortened" to --shorted--.
Col.  5, line 44, change "outut" to --output--.
Col.  5, line 56, change "outut" to --output--.
Col.  6, line 19, change "4" to --46--.

Col.  8, line 26, change "of", first occurrence, to --or--.
Col. 12, line 16, change "meely" to --merely--.
Col. 12, line 29, change "S-31" to --S---.
Col. 13, line 21, after "60" insert --so--.
Col. 14, line 41, change "element" to --elements--.
```

Signed and Sealed this

Twentieth Day of August 1985

[SEAL]

Attest:

DONALD J. QUIGG

Attesting Officer    Acting Commissioner of Patents and Trademarks